(12) United States Patent
Lyhr Jensen

(10) Patent No.: US 12,441,007 B2
(45) Date of Patent: Oct. 14, 2025

(54) TOOL CHANGER FOR COLLABORATIVE ROBOTS, A ROBOT TOOL CHANGER SYSTEM AND A METHOD FOR CONNECTING A TOOL TO A ROBOT ARM

(71) Applicant: C&J Holding ApS, Odense C (DK)

(72) Inventor: Christian Lyhr Jensen, Odense C (DK)

(73) Assignee: C&J Holding Aps, Odense C (DK)

( * ) Notice: Subject to any disclaimer, the term of this patent is extended or adjusted under 35 U.S.C. 154(b) by 916 days.

(21) Appl. No.: 17/617,229

(22) PCT Filed: Jun. 4, 2020

(86) PCT No.: PCT/EP2020/065522
§ 371 (c)(1),
(2) Date: Dec. 7, 2021

(87) PCT Pub. No.: WO2020/249465
PCT Pub. Date: Dec. 17, 2020

(65) Prior Publication Data
US 2022/0297316 A1 Sep. 22, 2022

(30) Foreign Application Priority Data
Jun. 12, 2019 (DK) .............................. PA201900710

(51) Int. Cl.
*B25J 15/04* (2006.01)
*B25J 19/00* (2006.01)

(52) U.S. Cl.
CPC ....... *B25J 15/0491* (2013.01); *B25J 15/0425* (2013.01); *B25J 19/0033* (2013.01); *B25J 19/0025* (2013.01)

(58) Field of Classification Search
CPC ......................... B25J 15/0491; B25J 15/0408; B25J 15/0425; B25J 19/0033; B25J 19/0025
See application file for complete search history.

(56) References Cited

U.S. PATENT DOCUMENTS

| 5,018,266 | A | | 5/1991 | Hutchinson et al. |
| 5,044,063 | A | | 9/1991 | Voellmer |
| 5,372,567 | A | * | 12/1994 | Whittington ......... B23Q 11/005 219/86.8 |

FOREIGN PATENT DOCUMENTS

| DK | 179486 B1 | 12/2018 | |
| FR | 2578775 A1 * | 9/1986 | .......... B25J 15/0491 |
| WO | 2019/054880 A1 | 3/2019 | |

OTHER PUBLICATIONS

Computer translated version of FR-2578775-A1 (Year: 2025).*
(Continued)

*Primary Examiner* — Eric A. Gates
(74) *Attorney, Agent, or Firm* — Merchant & Gould P.C.

(57) ABSTRACT

The present invention relates to a tool changer for automatically connecting a tool changer for collaborative robots, a robot tool changer system, and a method for connecting a tool to a robot arm. The tool changer comprises a first tool changer part intended to be mounted to an arm of the robot, the first tool changer part comprising first connecting means; a second tool changer part intended to be mounted to the operating device and comprising second connecting means. The first and second connecting means are arranged for mutual engagement, such that said first and second tool changer part may be connected and disconnected from each other.

15 Claims, 7 Drawing Sheets

(56) References Cited

OTHER PUBLICATIONS

PCT International Search Report for PCT Application No. PCT/EP2020/065522 mailed Aug. 26, 2020 (3 pages).
PCT Written Opinion for PCT Application No. PCT/EP2020/065522 mailed Aug. 26, 2020 (6 pages).

* cited by examiner

TOOL CHANGER FOR COLLABORATIVE ROBOTS, A ROBOT TOOL CHANGER SYSTEM AND A METHOD FOR CONNECTING A TOOL TO A ROBOT ARM

This application is a National Stage Application of PCT/EP2020/065522, filed 4 Jun. 2020, which claims benefit of Serial No. PA201900710, filed 12 Jun. 2019 in Denmark, and which applications are incorporated herein by reference. To the extent appropriate, a claim of priority is made to each of the above disclosed applications.

TECHNICAL FIELD

The present invention relates to a tool changer for automatically connecting a tool changer for collaborative robots, a robot tool changer system, and a method for connecting a tool to a robot arm.

The tool changer of the present invention is particularly suitable to be used in combination with autonomous robots designed to operate autonomously, or with at "cobot", also called a co-robot, which are collaborative robots typically intended to interact physically with humans in a shared workspace.

BACKGROUND OF THE INVENTION

Within the technical field of robotic technology, including autonomous robots or co-robots, it is known to arrange the robots with a variety of different operating devices, such as different tools for effecting a specific work operation of the robot.

For this operation, it is known to use tool changers/couplings between the robot arm and the specific tool. The couplings are typically two-part couplings with a first coupling part connected to the robot arm and a second coupling part connected to the specific tool.

These tool changers may be arranged with a human-operated quick-release mechanism instead of connecting the couplings to the robot and a tool with fastening means, such as screws. In this way, it is possible more rapid for a worker to connect and disconnect a tool to and from the robot arm.

These quick-release couplings are, compared to screw fastenings, particularly suitable when a tool change is needed in a short period of time, hereby resulting in a faster working process, and the working process is less costly in work labour.

However, as the collaborative robots used usually perform precision work, allowing an extremely limited tolerance, there is a risk that the known tool changers, due to human handling, are not properly connected and/or aligned when the work process is initiated.

Further, due to the human handling of the couplings with the connected tools, there is a risk that the coupling part and the associated tool may be damaged.

Further, prior art tool changers require an external element, which typically via an electrically or pneumatically connection engages the quick-release coupling. This renders the tool changers expensive and difficult to install in a work space, as a further power source is needed.

Even though the above-mentioned quick-release couplings are somehow more speedy to install, compared screw mounted couplings, they are still costly in work labour.

One example of prior art systems is disclosed in DK 179486 B1. The referred document discloses a tool changer for being arranged between a robot arm and a working tool. The tool changer comprises a first part and a second part being interconnectable by a user, through a pivoting mechanism and an associated locking mechanism.

It is an object of the present invention to provide a tool changer to be arranged between a robot arm and a working device, such as a tool, where the tool changer is configured such that the tool is mounted onto the robot arm in a precise and aligned position, and in a speedy and effective manner without the influence of humans. Further, as the tool changer is especially suited for autonomous robots, these robots may thus operate under complex work flows, solving a variety of work tasks.

The above object and advantages, together with numerous other objects and advantages, which will be evident from the following description of the present invention, are according to a first aspect of the present invention obtained by:

A tool changer for automatically connecting an operating device, such as a working tool, to an autonomous or collaborative robot, said tool changer comprising:
a first tool changer part intended to be mounted to an arm of said robot, said first tool changer part comprising first connecting means;
a second tool changer part intended to be mounted to said operating device and comprising second connecting means,
the first and second connecting means being arranged for mutual engagement, such that the first and second tool changer parts may be connected and disconnected from each other,
the first tool changer part further comprising third connecting means for connection to said robot, and
the second tool changer part further comprising fourth connecting means for connection to the operating device,
the first tool changer part comprising a first connection surface for facing the second tool changer and defining a first plane, and the second tool changer part comprising a second connection surface for facing the first connection surface and defining a second plane being parallel to the first plane,
the first connecting means projecting from the first connection surface substantially perpendicular to the first plane, and
the second connecting means being arranged for receiving the first connecting means,
the second tool changer part further comprising locking means which comprises locking elements for locking and unlocking the first connecting means to and from the second connecting means.

Hereby is defined a tool changer suitable to be arranged between a robot arm and a working device, such as a tool, where the tool changer is configured such that the tool can be mounted onto the robot arm in a precise position, in a speedy and effective manner, without influence of humans. Even though the tool changer is suited for automatic connection and disconnection, it is however still possible to use the tool changer in a manual operation.

According to a further embodiment of the first aspect of the invention, the first connecting means comprises elongated cylindrical projecting elements, projecting from the first connection surface, and the second connecting means comprises corresponding interacting openings arranged through the second connection surface.

The first connecting means are in preferred embodiment cylindrical elements, and in an especially preferred embodiment circular cylindrical elements, and are in a preferred embodiment arranged as individually spaced, circular cylindrical elements. It is however to be understood that the cylindrical elements in an alternative embodiment may be arranged as cylindrical elements other than circular cylindrical elements, such as square, rectangular oval, etc.

In a further alternative embodiment, the connecting means may be defined by only one projecting element, such as one square cylindrical element. The connecting means may thus have any number of projecting elements.

According to a further embodiment of the first aspect of the invention, the first connecting means comprises locking portions for engaging the locking elements, such that the first tool changer part and the second tool changer part are interlocked in a direction substantially perpendicular to the first and second planes.

In order to establish a secure and stabile connection between the first tool changer part and the second tool changer part, the locking elements, which are preferably arranged internally of the second tool changer part, engage the locking portions of the first tool changer part.

According to a further embodiment of the first aspect of the invention, the locking portions comprise recesses arranged at an end of the first connecting means, the recesses extending in a direction substantially parallel to said first and second planes.

The locking portions are in a preferred embodiment defined by recesses in the first connection means. The locking portions may in an alternative embodiment comprise holes through the first connecting means, and may in an even further alternative embodiment comprise projections, which interact with recesses in the locking elements.

According to a further embodiment of the first aspect of the invention, said locking elements are displaceable in a direction parallel to said first and second planes, and are arranged for a first unlocked position, where said locking elements are disengaged from said locking portions, and a second locked position, where said locking elements engage said locking portions, thereby preventing movement of said first connecting means in relation to said second connecting means.

According to a further embodiment of the first aspect of the invention, the recess comprises flanges defining inclined surfaces, which are inclined in relation to the first and second planes, such that the locking elements interact with the inclined surfaces when the locking elements engage the locking portions.

The recesses comprise a flange with an inclined surface defining an angle in relation to the first and second planes. This has the technical effect that the locking elements more easily engage the recesses, and when the locking means engage the recesses, the inclined surface urges the locking means into tight engagement with the recesses.

According to a further embodiment of the first aspect of the invention, each of said flanges comprises a first recess flange and a second recess flange, said inclination of said first recess flange being larger than said inclination of said second recess flange. The recesses in an especially preferred embodiment comprise a flange having two inclined surfaces, each defining an angle in relation to the first and second planes, where the first recess flange has a larger angle than the second recess flange, such that the first recess flange has the technical effect that the locking elements more easily engage the recesses, and the second recess flange has the technical effect that the second flange urges the locking means into tight engagement with the recesses.

According to a further embodiment of the first aspect of the invention, the locking elements comprise first locking elements and second locking elements being displaceable towards and away from each other, the locking means further comprising rotation elements arranged for rotation around an axis substantially perpendicular to the first and second planes, and arranged to interact with the displaceable locking elements, such that the locking elements can move between said unlocked position and the second locked position.

According to a further embodiment of the first aspect of the invention, the rotation elements comprise engagement parts being arranged for cooperation with a device holder, arranged to suspend the second tool changer part, such that upon displacement of said device holder from a first engaged position to a second disengaged position, the engagement parts interact with the device holder, causing the rotating elements to rotate and thereby causing the locking means to displace in relation to each other.

According to a further embodiment of the first aspect of the invention, the rotation elements comprise an eccentric locking groove which interacts with a locking pin arranged on the first and second locking elements, respectively.

Arranging the rotation elements with an eccentric groove has the technical effect that the first and second locking elements engage the recesses with great force during a final locking motion. Further, when the first and second locking means are unlocked from the recesses, the first unlocking motion is exceeded with great force. The rotation elements may be arranged with other suitable means for interacting with the locking elements, and the rotation may thus be arranged as a gear wheel or comprise other means, such as linking arms which cooperate with the locking elements.

According to a further embodiment of the first aspect of the invention, the second tool changer part comprises openings for cooperating with the device holder in a displaceable manner, the engagement parts being arranged within the opening for engaging the device holder.

According to a further embodiment of the first aspect of the invention, the openings comprise flanges, defining inclined surfaces, which are inclined in relation to the first and second planes, such that the device holder interacts with the inclined surfaces upon engaging the device holder with the second tool changer part.

In order to allow the robot arm to change tools without the assistance of humans, the present tool changer operates in connection with the device holder for in a simple manner to connect the first tool changer part to the second part through simple motions, and further secures the tool changer in a fixed position on the device holder due to the surface inclination.

The device holder preferably comprises two gripping elements which engage the openings arranged on opposite sides of the tool changer. When engaging the device holder to the openings, it is especially advantageous that the openings comprise inclined flanges, such that the device holder and griping means are guided into proper engagement with the second tool changer part.

According to a further embodiment of the first aspect of the invention, the tool changer comprises an interchangeable and integrated pass-through module for connecting a flow, such as an electric current, a pneumatic or hydraulic flow, from the first tool changer part to the second tool changer part, the integrated pass-through module comprising a first pass-through module part connected to the first tool changer part, and a second pass-through module part connected to the second tool changer part. The module parts comprise mating terminals for arranging an electrical or a pneumatic or a hydraulic connection in a fluid-tight manner.

The tool changer preferably comprises pass-through modules, which are modules that establish a "power" source connection or "flow" through the tool changer, which connection may be electrical, pneumatic or hydraulic. The individual tools for the robot may require different power sources, such that some tools may be electrically operated, pneumatically or hydraulically operated. Some specific tools even require several power sources, such as several electrical sources, several pneumatic or hydraulic sources, or a combination of some or all of the above-mentioned sources.

According to a further embodiment of the first aspect of the invention, the tool changer comprises an external pass-through module housing comprising a number of external interchangeable pass-through modules arranged integrated in the housing for connecting a flow, such as an electric current, a pneumatic or hydraulic flow, from the first tool changer part to the second tool changer part, the housing comprising a first housing part arranged on the first module part, and a second housing part arranged on the second module part, the integrated pass-through modules comprising a first pass-through module part connected to the first housing part, and a second pass-through module part connected to the second housing part. The module parts comprise mating terminals for arranging an electrical and/or a pneumatic and/or a hydraulic connection in a fluid-tight manner, and the number of mating external pass-through modules are preferably two, or most preferably three.

Arranging the tool changer with the above-mentioned housing, suitably to incorporate several pass-through modules, is preferred where the needed tool requires a plurality of power sources. That may be several electrical, hydraulic or pneumatic power sources or any combination thereof. The pass-through modules are mechanical poka-yokes featured so that they will fit together in pairs of electrical, pneumatic or hydraulic modules and so that incorrect configuration by the operator will not damage the modules, as features ensure that they cannot connect to each other.

According to a second aspect of the present invention, the above objects and advantages are obtained by a tool changer system comprising a tool changer according to any of the accompanying claims 1-13, and a device holder comprising gripping means for engaging the second tool changer part.

According to a third aspect of the present invention, the above objects and advantages are obtained by a method for connecting an operating device, such as a working tool, to a robot arm, the method comprising the following steps:

providing a robot arm having a first tool changer part according to the first aspect, providing a device holder having a second tool changer part, according to the first aspect, the device holder comprising gripping means for engaging the rotation elements. The method further comprises the following steps:

moving the robot arm having the first tool changer part to a position, thereby arranging the first connection surface so as to face the second connection surface, moving the first tool changer part towards the second tool changer part, hereby connecting the first and second connecting means, moving the robot arm, having the first tool changer part and the engaged second tool changer part, in a direction parallel to the first and second planes, and in a direction away from the device holder. The gripping means hereby engage the rotation elements, which hereby rotate and engage the displaceable locking elements into a position where the locking elements engage the recesses.

Figure 1A:
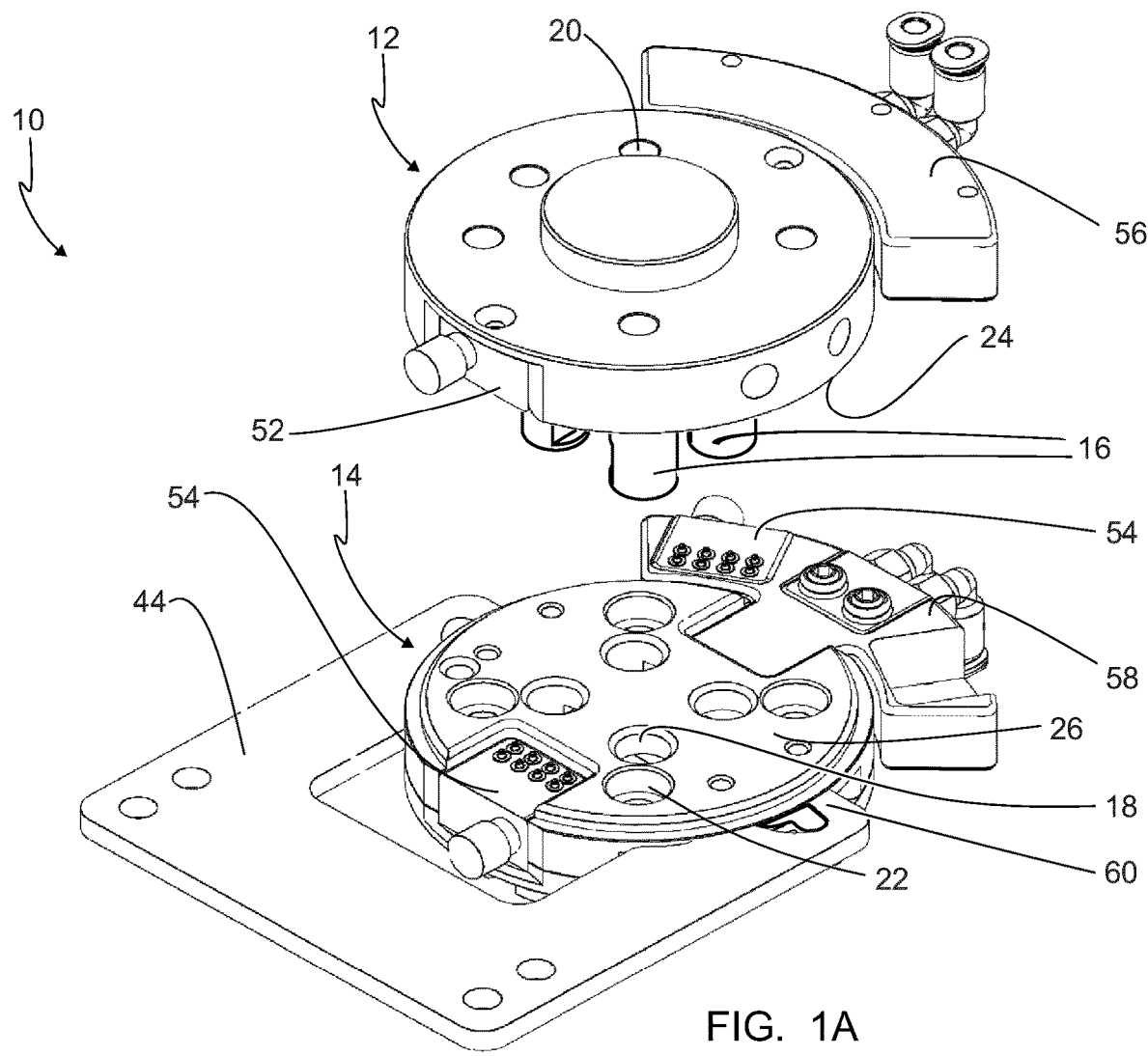
FIG. 1A is a perspective view of a disconnected tool changer and a connected device holder.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will thus not be described in detail with respect to the description of each figure.

Figure 1B:
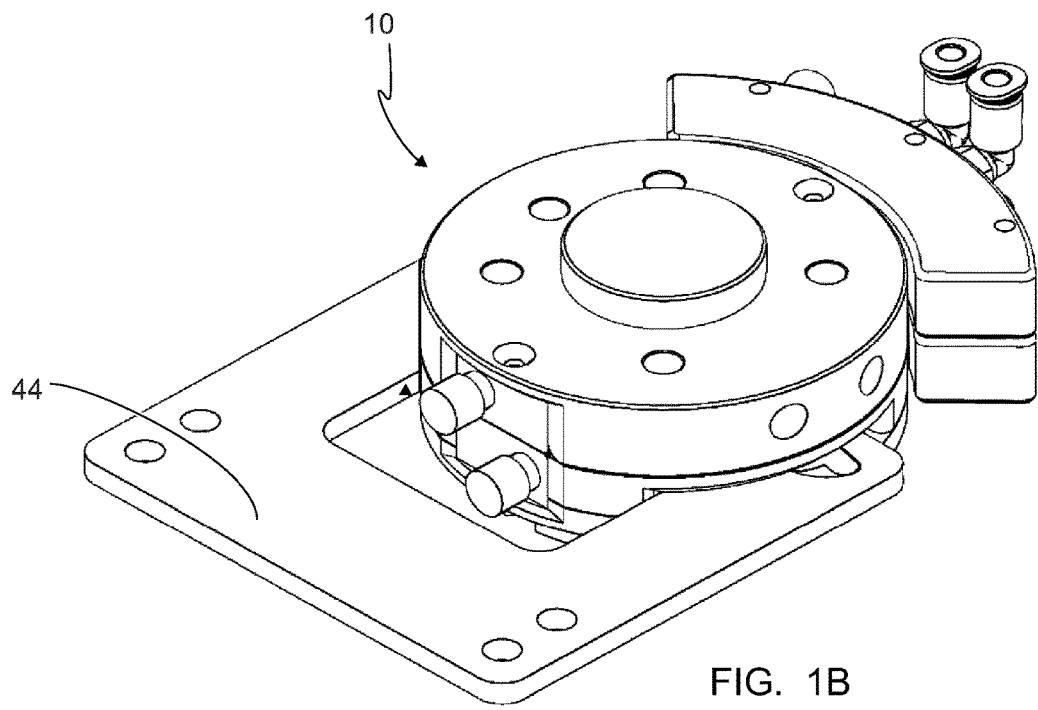
FIG. 1B is a perspective view of a connector and a device holder.
Figure 1C:
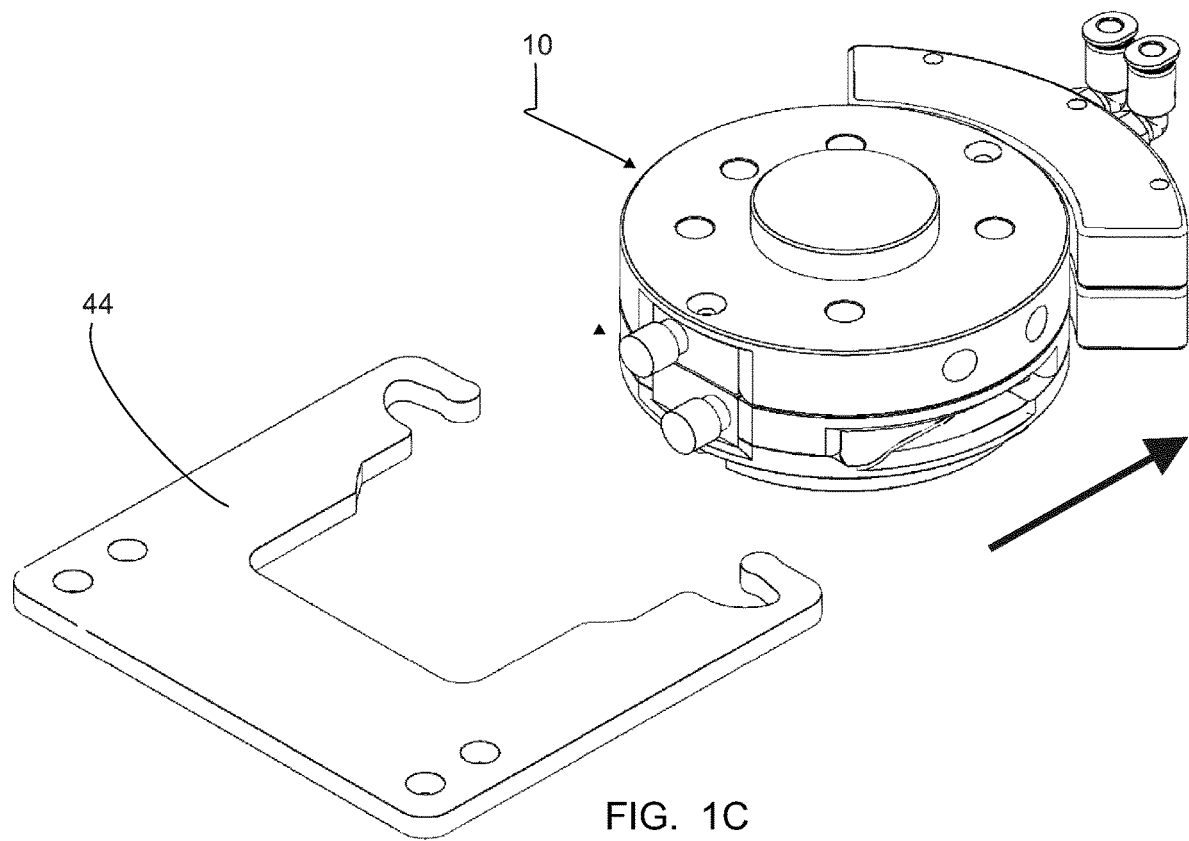
FIG. 1O is a perspective view of a tool changer and a disconnected device holder.

FIG. 1 is a perspective view of a disconnected tool changer 10 and a connected device holder 44. The tool changer 10 is illustrated with a first tool changer part 12 having a first connection surface 24, and a second tool changer part 14 having a second connection surface 26. The first tool changer part 12 comprises first connecting means 16 extending from the first connection surface 24, and the second tool changer part 14 comprises second connecting means 18 arranged as openings extending from the second connection surface 24 and into the second tool changer part 14. The first connecting means 16 are in the illustrated embodiment composed of four cylindrical (only three are shown) elements, and the second connecting means 18 are in the illustrated embodiment composed of four corresponding cylindrical openings having an opening diameter allowing a minimal tolerance between the first connecting means 16 and the second connecting means 18.

The first connecting means 16 may thus be tightly engaged within the second connecting means 18.

FIG. 1 further illustrates a device holder 44 which is connected to the second tool changer part 14. The device holder 44 is preferably mounted, via holes, to a supporting structure (not shown), such as a table or other suitable structures. The device holder 44 comprises a pair of gripping means 60 which engages the second tool changer part 14, such that when the second tool changer part 14 is disconnected from the first tool changer part and the robot arm (not shown), the second tool changer part 14 is securely connected to the device holder 44 via the gripping means 60 and internal flanges of the device holder 44. The gripping means 60 further engages locking means 28, 30 (not shown) arranged inside the second tool changer part 14. The locking means 28, 30 are arranged for engagement with the first connecting means 16, such that upon displacement of the device holder 44 in relation to the second tool changer part, the gripping means 60 activates the locking means via rotating elements 36 (not shown) for engagement with the first connecting means 16. In the shown embodiment, the device holder 44 engages the second tool changer part 14 such that the internal locking means (not shown) are in a disengaged position and the first connector part 12 is disengaged from the second tool changer part 14.

FIG. 1 further illustrates that the tool changer 10 comprises pass-through modules 52, 54, which are modules that establish a power source connection or "flow" through the tool changer 10, which connection may be electrical, pneumatic or hydraulic. The individual tools for the robot may require different power sources, such that some tools may be electrically operated, pneumatically or hydraulically operated. Some specific tools even require several power sources, such as several electrical sources, several pneumatic or hydraulic sources, or a combination of some of all of the mentioned sources. For that reason, the tool changer 10 comprises a first integrated pass-through module which comprises a first pass-through module part 52 and a second pass-through module part 54. Each of the module parts 52, 54 are interchangeable and may be changed to a different module type depending on the need.

In order to arrange the tool changer 10 suitably for tools that require a plurality of power sources, the tool changer 10 comprises a housing which is defined by an upper housing part 56 and a lower housing part 58. Each housing part 56, 58 comprises a plurality of interchangeable pass-through module parts 52,54 which, in the illustrated figure, are three pairs. The tool changer 10 shown in FIG. 1 may thus be supplied with several individual power sources. It is thus to be understood that the number of pairs within the housing may be less or more than three. As the housing in itself is disconnectable from the tool changer 10, any different housing may be applied according to need and desire.

FIG. 1B is a perspective view of a connector and a device holder 44. The tool changer 10 and device holder 44 of FIG. 1B correspond to the embodiment of FIG. 1A. In the shown embodiment, the first tool changer part 12 is brought into engagement with the second tool changer part 14 where the locking means are in an unlocked position due to the engagement of the device holder 44. The first connecting means 16 extends within the second connecting means 18, and the connection surfaces 24, 26 are preferably abutting each other or in a close relationship.

FIG. 10 is a perspective view of a tool changer 10 and a disconnected device holder 44. The tool changer 10 and device holder 44 of FIG. 10 correspond to the embodiments of FIG. 1A and FIG. 1B.

In the embodiment shown in FIG. 10, the first tool changer part 12 is interconnected to the second tool changer part 14 such that the locking means (not shown) engages the first connecting means 16. From the embodiment in FIG. 1B to the embodiment in FIG. 10, the first tool changer part 12, which is connected to the robot arm (not shown), is engaged with the second tool changer part 14 and moved by the robot arm in a direction illustrated by the arrow (FIG. 10), and out of engagement with the device holder 44. Hereby, the gripping means 60 of the device holder 44 activates the internal locking means into engagement with the first connecting means 16. The first tool changer part 12 and the second tool changer part 14 are hereby securely connected, and the robot arm (not shown) having the tool (not shown) may operate.

Figure 2A:
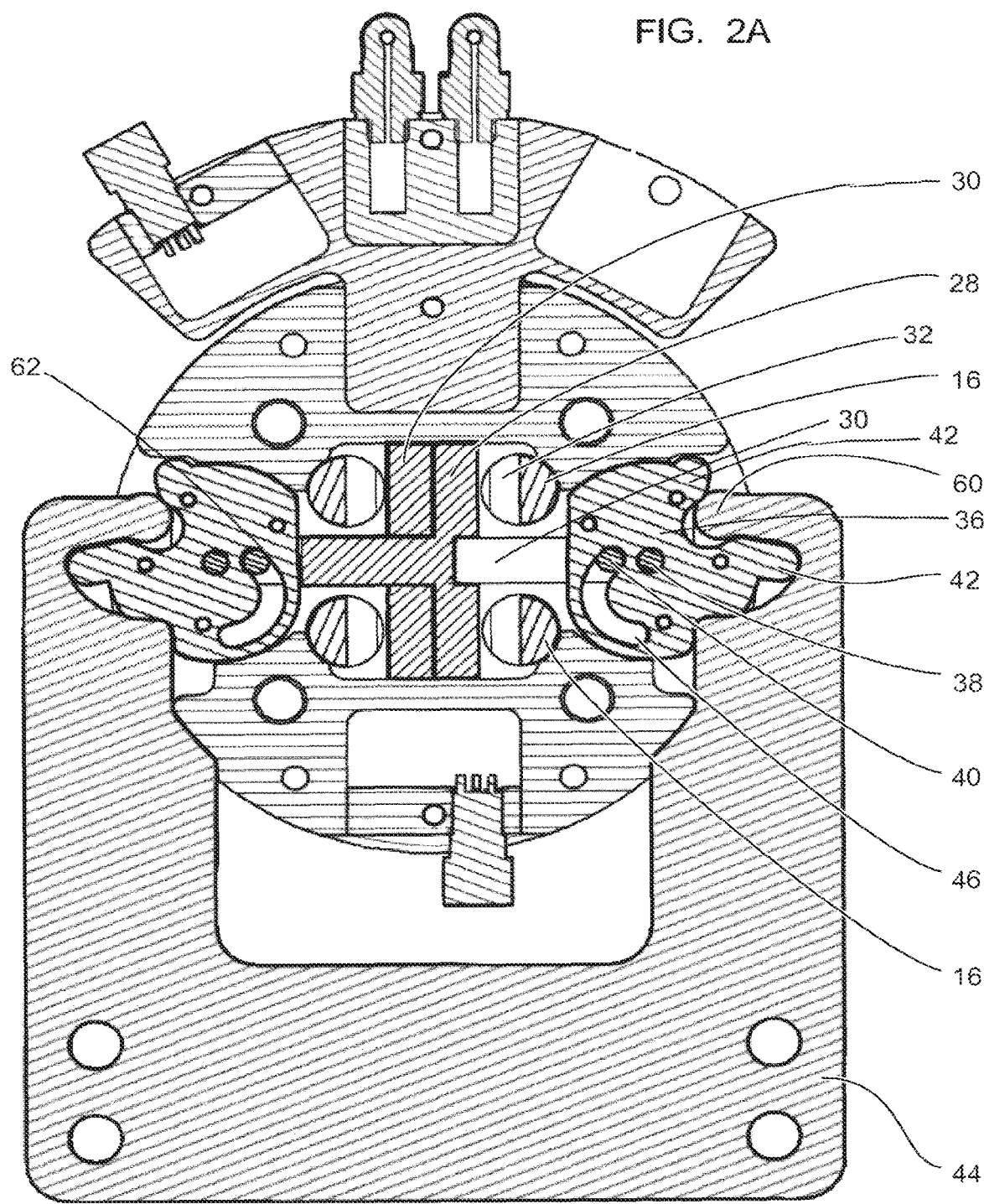
FIG. 2A is a horizontal cross-sectional view of the tool changer and the device holder.
Figure 2B:
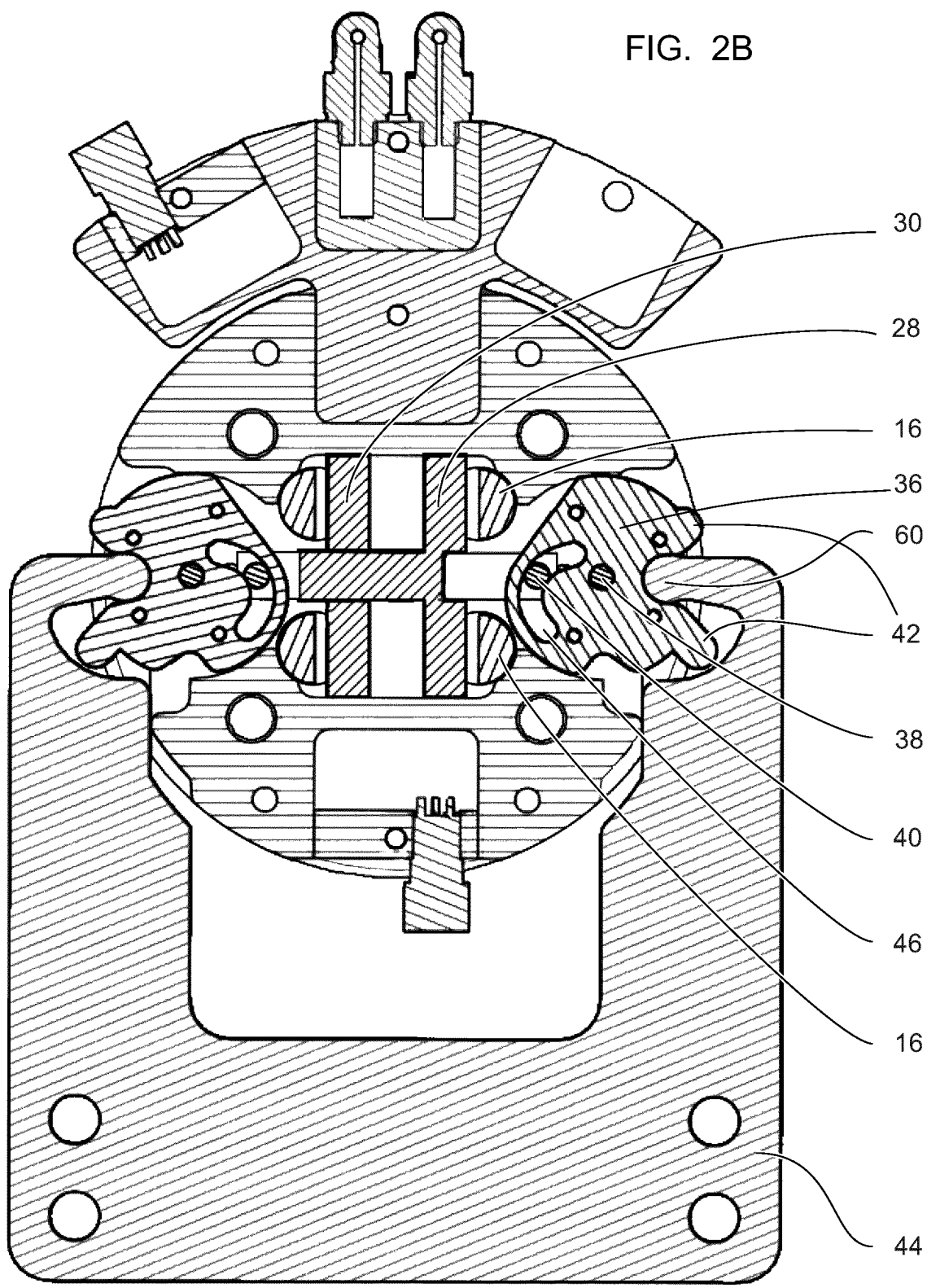
FIG. 2B is a horizontal cross-sectional view of the tool changer and the device holder.
Figure 2C:
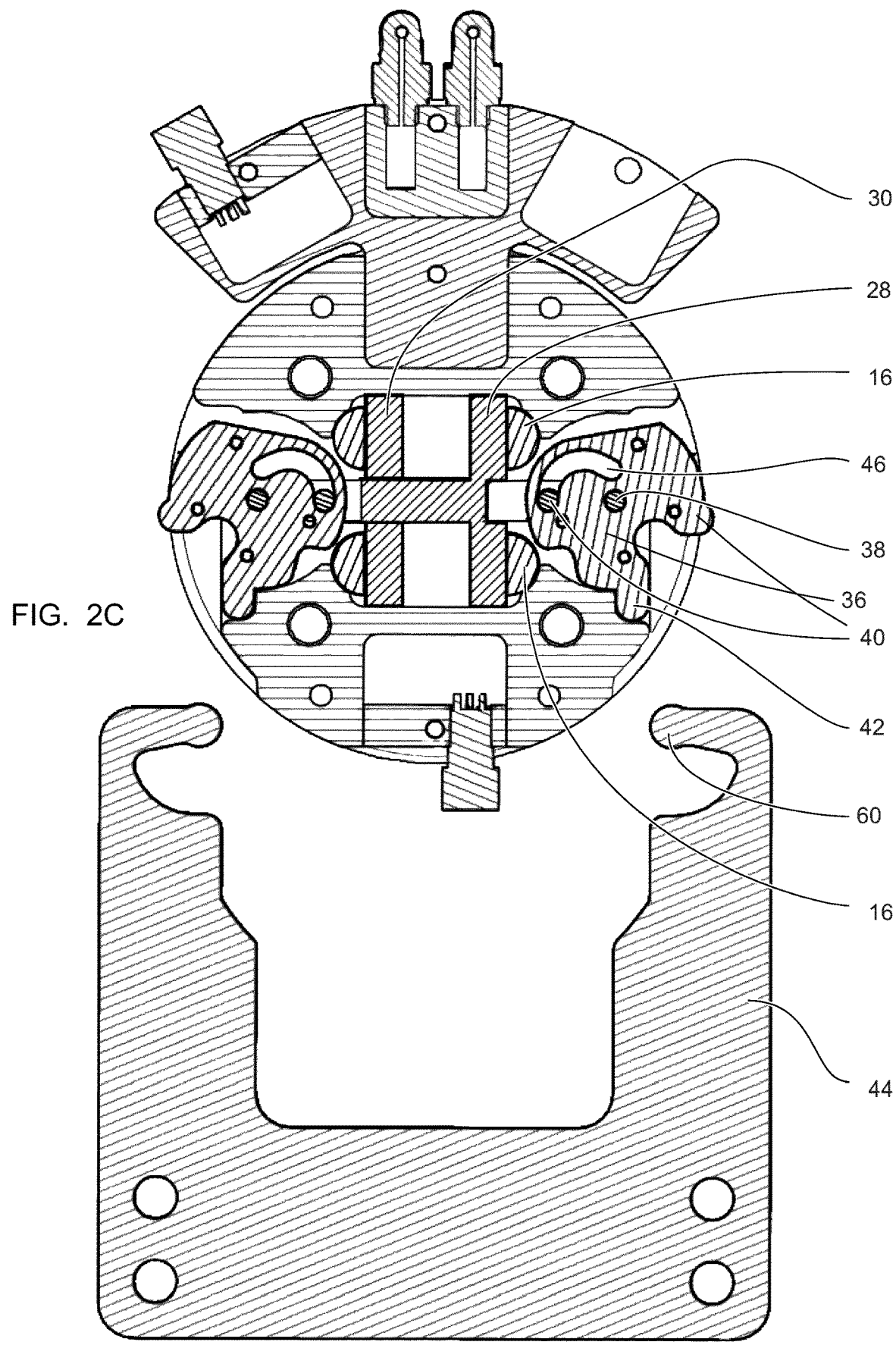
FIG. 2C is a horizontal cross-sectional view of the tool changer and the device holder.

FIGS. 2A-2C are horizontal cross-sectional views of the tool changer 10 and the device holder 44. The illustrations are views through the device holder 44 and the second tool changer part 14 in a situation where the first connecting means 16 of the first tool changer part 12 engages the second connecting means 18. In FIGS. 2A-2C is shown that the locking means comprises a first locking element 28, a second locking element 30, and two rotating elements 36.

The locking elements 28, 30 are arranged for mutual displacement towards and away from each other, and are in FIG. 1 shown in a position where the locking elements 28, 30 are towards each other and disengaged from the first connecting means 16.

The first connecting means are illustrated with recesses 32, such that the first and second locking means 28, 30, when displaced away from each other as shown in FIGS. 2B and 2C, engage the recesses 32 and lock the first connecting means 16 within the second connecting means 18.

Each of the first and second locking elements 28, 30 comprises a locking pin 40 which engages a locking groove 46 arranged in the rotating elements 36.

The rotating elements 36 rotate around a rotation axis 38, such that upon rotation, the locking pins are guided within the locking grooves 46, which are arranged in an eccentric manner in the rotating element. This eccentric arrangement of the locking grooves 46 causes the locking pins 40—and hereby the first and second locking elements 28, 30—to displace in relation to each other.

The rotating elements 36 further comprise engagement parts 42 which are arranged to engage the gripping means 60 of the device holder 44. When the device holder 44 is brought in and out of engagement with the tool changer 10, as shown in FIGS. 2A-2C, the rotating elements 36 rotate when the gripping means 60 interact with the engagement parts 42.

Between the locking pins 40, there is preferably arranged a spring (not shown), such as a coil spring. The spring has the technical effect that the locking pins 40 are kept in the same position within the locking groove 46 when the tool changer 10 is disconnected from the device holder 44, which ensures that the first and second tool changer parts do not accidental disengage. The spring ensures that the first and second locking elements 28, 30 do not displace in relation to each other when being in a locked position according to FIG. 10. The spring is in a preferred embodiment arranged between the locking pins; however, it is possible for the skilled person to arrange the spring on e.g. the rotating elements, causing the same effect.

Referring to FIG. 2A, where the first and second locking elements 28, 30 are in an unlocked position, each locking groove 46 may have a locking groove recess (not shown). This recess engages the locking pins, and the recess extends towards the first and second locking elements 28, 30 at an end of the locking grooves (marked by reference numeral 62). Here the locking pins 40 will engage the locking groove recesses and be kept in this position due to the spring action. However, when the tool changer 10 is "pulled" out of engagement with the device holder 44, the spring force is overcome, and the rotating elements rotate.

Figure 3:
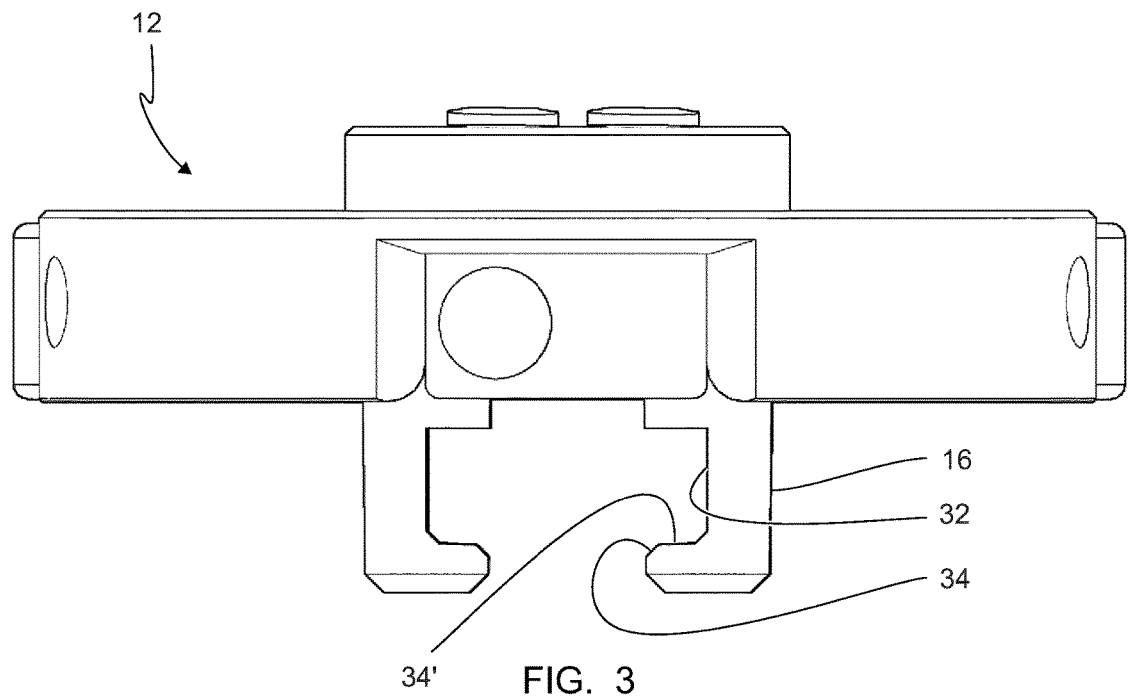
FIG. 3 is a horizontal side view of the first tool changer part.

FIG. 3 shows a horizontal side view of the first tool changer part.

FIG. 3 clearly illustrates the recesses 32 of the first connecting means 16. The recesses 32 comprise an inclined bottom flange, which in the illustrated embodiment comprises two bottom flange parts, a first recess flange 34, and a second recess flange 34'. The first and second recess flanges 34, 34' define different inclinations in relation to the first connection surface 24. The first recess flange 34 preferably has an angle between 30-60 degrees, more preferable approximately 45 decrees.

The first recess flange 34 may thus have a different inclination, either below og above the specified angles, however, the inclination of the first recess flange 34 being larger than the inclination of the second recess flange 34'. One preferred embodiment of an angle of the second recess flange 34' is approximately 3 degrees. This angle may thus be different from 3 degrees, such as higher or lower. The angle of the first recess flange 34 has the technical effect that the first and second locking elements 28, 30 are guided into engagement with the recesses 32. This has the advantage that in a situation where the first connecting means 16 is not fully inserted into the second connecting means 18, the locking elements 28, 30 in combination with the recess flanges 34 will draw the first and second tool changer parts 12, 14 together.

The second recess flange 34' has the technical effect that when the first and second locking 28, 30 engage the recesses 32, the second recess flange 34' having a lower inclination which will urge the first and second tool changer parts 28, 30 together with great force, hereby ensuring a tight contact. It is to be understood that the first and second locking elements likewise comprise corresponding lower flanges which interact with the first and second recess flanges 34, 34'.

Figure 4:
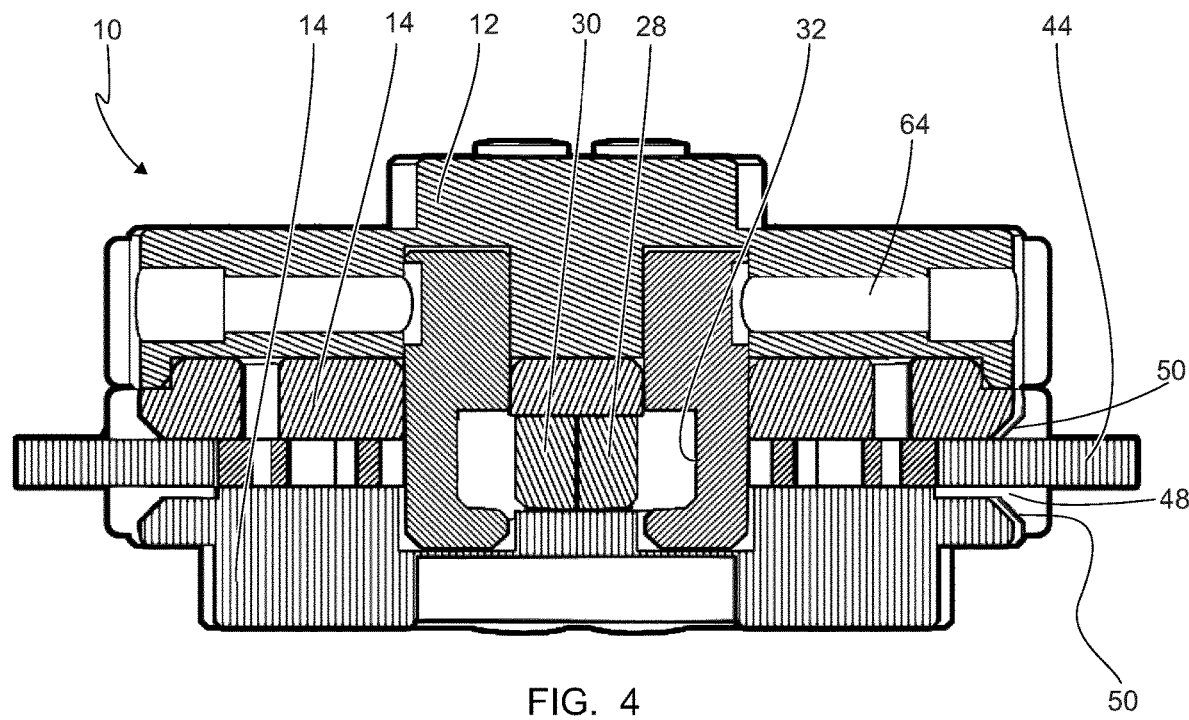
FIG. 4 is a vertical cross-sectional view of the tool changer and device holder.

FIG. 4 shows a vertical cross-sectional view of the tool changer 10 and device holder 44. The figure shows the first tool changer part 12 being engaged with the second tool changer part 14 in an unlocked position.

It is apparent from the figure, that the first and second locking elements 28, 30 comprise the above-mentioned corresponding flanges.

The first tool changer part 12 further comprises fastening means 64 which fastens the first connecting means 16 to the first tool changer part 12 in a displaceable manner, such that the extension of the first connecting means 16 in relation the first tool changer part 12 can be adjusted. Further, the fastening means 64 ensures that the first connecting means 16 may be exchanged with other means.

The second tool changer part 14 further comprises flanges 50 arranged at the opening 48, where the gripping means 60 of the device holder 44 engages the second tool changer part 14. These flanges 50 are arranged with an inclination in relation to the second connection surface 26, such that the device holder 44 is guided in correct alignment with the second tool changer part 14.

Figure 5:
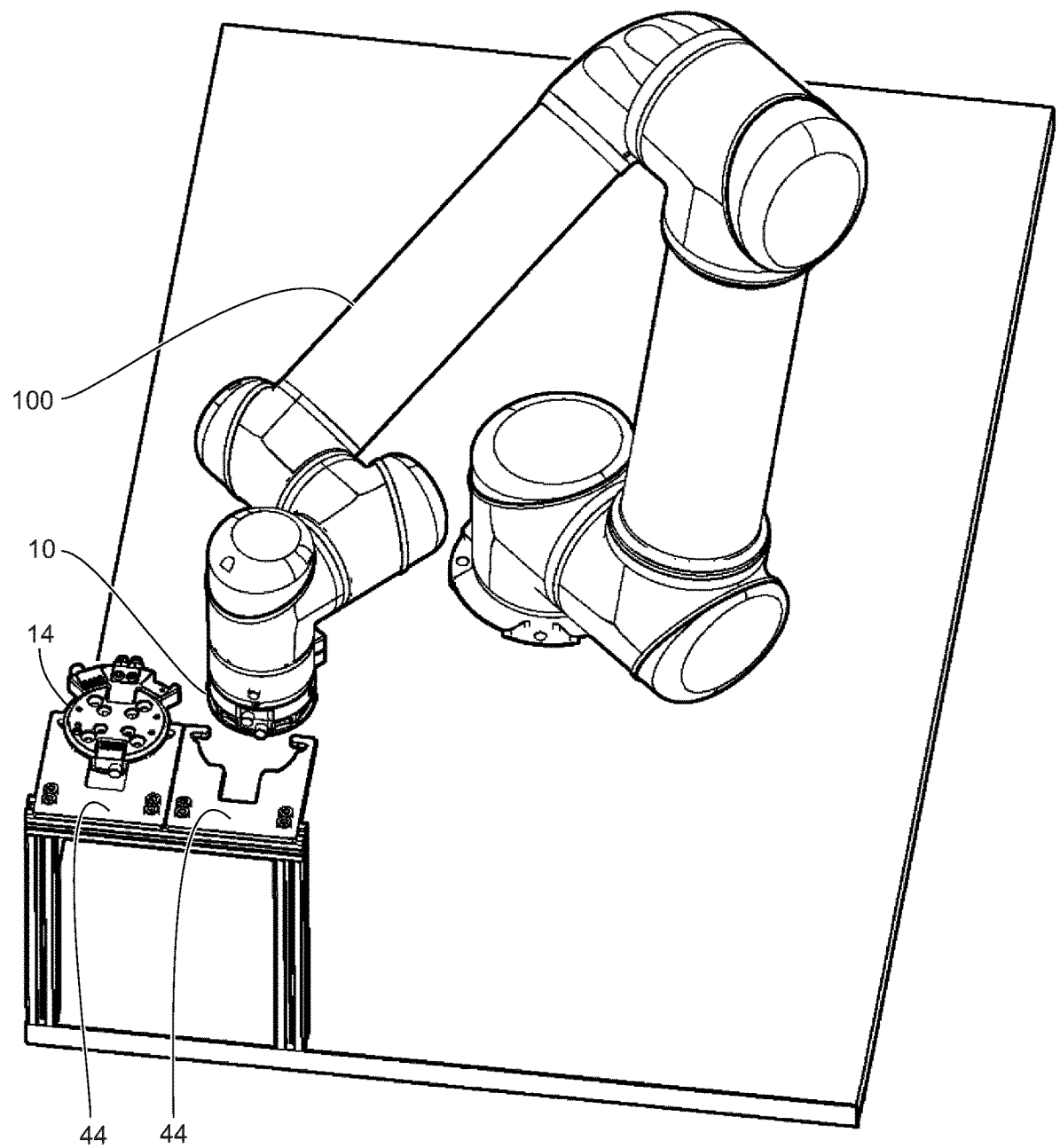
FIG. 5 is a perspective view of a robot and a tool changer system.

FIG. 5 shows a perspective view of a robot and a tool changer system, where the system comprises two device holders 44 mounted to a supporting construction. The tool changer may comprise any suitable tool (not shown) mounted to the second tool changer parts 14.

The figure illustrates a robot, having a robot arm 100 and a tool changer 10 connected to the robot arm 100. The figure further illustrates a second tool changer part 14 being mounted onto one of the two device holders 44.

The tool changer 10, which is mounted to the robot arm 100, is out of engagement with the respective device holder 44, whereby the first and second tool changer parts 12, 14 are interlocked. In order for the robot arm 10 to equip the "other" second tool changer part 14 arranged freely in the device holder, the robot arm 100 brings the mounted tool changer 10 into engagement with the devise holder 44, such that the gripping means 60 engages the second tool changer part 14 and disengages the first and second locking elements 28, 30 from the first connecting means 16. The first and second tool changer parts 12, 14 are hereby unlocked, and the robot arm 100 moves the first tool changer part 12 in a vertical direction and out of engagement with the second tool changer part 14. Thereafter, the robot arm 100 moves the first tool changer part 12 to a position directly above the "other" second tool changer part 14 having the desired tool (not shown), whereafter the robot arm 100 moves the first tool changer part 12 in a vertical direction and into engagement with the "other" second tool changer part 14. As a final step, the robot arm 100 moves the first tool changer part 12 and the "other" engaged second tool changer part 14 in a horizontal direction, out of engagement with the device holder 44, whereby the first and second tool changer parts interlock.

LIST OF REFERENCE NUMBERS

10 Tool changer
12 First tool changer part
14 Second tool changer part
16 First connecting means
18 Second connecting means
20 Third connecting means
22 Fourth connecting means
24 First connection surface
26 Second connection surface
28 First locking element
30 Second locking element
32 Recess
34 First recess flange
34' Second recess flange
36 Rotating elements
38 Rotation axis
40 Locking pin
42 Engagement part
44 Device holder
46 Locking groove
48 Opening
50 Opening flanges
52 First pass-through module part
54 Second pass-through module part
56 First housing part
58 Second housing part
60 Gripping means
62 Locking recess
64 First connecting means fastening
100 Robot arm

The invention claimed is:

1. A tool changer for automatically connecting an operating device to an autonomous or collaborative robot, said tool changer comprising:

a first tool changer part intended to be mounted to an arm of said robot, said first tool changer part comprising first connecting means;

a second tool changer part intended to be mounted to said operating device and comprising second connecting means, said first and second connecting means being arranged for mutual engagement, such that said first and second tool changer parts may be connected and disconnected from each other, said first tool changer part comprising a first connection surface for facing said second tool changer part and defining a first plane, and said second tool changer part comprising a second connection surface for facing said first connection surface and defining a second plane being parallel to said first plane, said first connecting means projecting from said first connection surface substantially perpendicular to said first plane, and said second connecting means being arranged for receiving said first connecting means, wherein said second tool changer part further comprises locking means, which comprises locking elements for locking and unlocking said first connecting means to and from said second connecting means, said first connecting means comprising locking portions for engaging said locking elements, such that said first tool changer part and said second tool changer part are interlocked in a direction substantially perpendicular to said first and second planes, said locking portions comprising recesses arranged at an end of said first connecting means, said recesses extending in a direction substantially parallel to said first and second planes, said locking elements being displaceable in a direction parallel to said first and second planes and being arranged for a first unlocked position, where said locking elements are disengaged from said locking portions, and a second locked position, where said locking elements engage said locking portions, thereby preventing movement of said first connecting means in relation to said second connecting means, and wherein said locking elements comprise first locking elements and second locking elements being displaceable towards and away from each other, said locking means further comprising rotation elements arranged for rotation around an axis substantially perpendicular to said first and second planes, and arranged to interact with said displaceable locking elements, such that said locking elements can move between said first unlocked position and said second locked position.

2. The tool changer according to claim 1, wherein said first connecting means comprises elongated cylindrical projecting elements, projecting from said first connection surface, and said second connecting means comprises corresponding interacting openings, arranged through said second connection surface.

3. The tool changer according to claim 1, wherein said recess comprises flanges defining inclined surfaces, which are inclined in relation to said first and second planes such that said locking elements interact with said inclined surfaces when said locking elements engage said locking portions.

4. The tool changer according to claim 3, wherein each of said flanges comprises a first recess flange and a second recess flange, said inclination of said first recess flange being larger than said inclination of said second recess flange.

5. The tool changer according to claim 1, wherein said rotation elements comprise engagement parts being arranged for cooperation with a device holder arranged to suspend said second tool changer part, such that upon displacement of said device holder from a first engaged position to a second disengaged position, said engagement parts interact with said device holder, causing said rotating elements to rotate and thereby causing said locking means to displace in relation to each other.

6. The tool changer according to claim 5, wherein said rotation elements comprise an eccentric locking groove which interacts with a locking pin arranged on said first and second locking elements, respectively.

7. The tool changer according to claim 5, wherein said second tool changer part comprises openings for cooperating with said device holder in a displaceable manner, said engagement parts being arranged within each of said openings for engaging said device holder.

8. The tool changer according to claim 7, wherein said openings comprise flanges defining inclined surfaces, which are inclined in relation to said first and second planes, such that said device holder interacts with said inclined surfaces upon engaging said device holder with said second tool changer part.

9. The tool changer according to claim 1, wherein said tool changer comprises an interchangeable and integrated pass-through module for connecting a flow from said first tool changer part to said second tool changer part, said integrated pass-through module comprising a first pass-through module part connected to said first tool changer part, and a second pass-through module part connected to said second tool changer part, said module parts comprising mating terminals for arranging an electrical or a pneumatic or a hydraulic connection in a fluid-tight manner.

10. The tool changer according to claim 9, wherein said tool changer comprises an external pass-through module housing comprising a number of external interchangeable pass-through modules arranged integrated in said housing for connecting a flow from said first tool changer part to said second tool changer part, said housing comprising a first housing part arranged on said first tool changer part and a second housing part arranged on said second tool changer part, said integrated pass-through modules comprising a first pass-through module part connected to said first housing part, and a second pass-through module part connected to said second housing part, said module parts comprising mating terminals for arranging an electrical and/or a pneumatic and/or a hydraulic connection in a fluid-tight manner.

11. The tool changer according to claim 10, wherein the flow comprises an electric current, a pneumatic flow, or a hydraulic flow.

12. The tool changer according to claim 10, wherein said number of mating external pass through modules being two.

13. The tool changer according to claim 10, wherein said number of mating external pass through modules being three.

14. The tool changer according to claim 9, wherein the flow comprises an electric current, a pneumatic flow, or a hydraulic flow.

15. The tool changer according to claim 1, wherein the operating device comprises a working tool.

\* \* \* \* \*